United States Patent
Champ-Locatelli Ép. Saltapes

(10) Patent No.: US 12,331,811 B2
(45) Date of Patent: Jun. 17, 2025

(54) GEAR ARRANGEMENT

(71) Applicant: CHAMP-LOCATELLI ÉP. SALTAPES, Estebane Geoffrey Joseph, La Balme (FR)

(72) Inventor: Estebane Geoffrey Joseph Champ-Locatelli Ép. Saltapes, La Balme (FR)

(*) Notice: Subject to any disclaimer, the term of this patent is extended or adjusted under 35 U.S.C. 154(b) by 0 days.

(21) Appl. No.: 18/853,676

(22) PCT Filed: Apr. 7, 2023

(86) PCT No.: PCT/IB2023/000207
§ 371 (c)(1),
(2) Date: Oct. 2, 2024

(87) PCT Pub. No.: WO2023/194804
PCT Pub. Date: Oct. 12, 2023

(65) Prior Publication Data
US 2025/0109781 A1    Apr. 3, 2025

(30) Foreign Application Priority Data
Apr. 8, 2022 (GB) ..................... 2205215

(51) Int. Cl.
*F16H 55/08* (2006.01)
*F16H 1/32* (2006.01)
*F16H 1/46* (2006.01)

(52) U.S. Cl.
CPC ............ *F16H 1/32* (2013.01); *F16H 1/46* (2013.01); *F16H 55/0806* (2013.01); *F16H 55/088* (2013.01)

(58) Field of Classification Search
CPC .............. F16H 2001/324; F16H 1/00–2720/04
See application file for complete search history.

(56) References Cited

U.S. PATENT DOCUMENTS 3,955,445 A * 5/1976 Osterwalder ............. F16H 1/32
475/181
5,232,412 A   8/1993 Yue et al.
5,505,668 A   4/1996 Koriakov-Savoysky et al.

FOREIGN PATENT DOCUMENTS

CN    1075879 C    12/2001
CN    201137672 Y * 10/2008    ............... F16H 1/32
(Continued)

OTHER PUBLICATIONS

International Search Report and Written Opinion for Patent Cooperation Treaty Application No. PCT/IB2023/000207, dated Oct. 12, 2023, 14 pages.
(Continued)

*Primary Examiner* — Sherry L Estremsky
(74) *Attorney, Agent, or Firm* — Alston & Bird LLP

(57) ABSTRACT

A gearbox comprising an internal-external gear pair having a small tooth-difference, the internal-external gear pair comprising: an internal gear arranged about an internal gear axis and having a first number of internal gear teeth; and an external gear having an external gear axis arranged to orbit the internal gear axis and having a second number of external gear teeth, the external gear being arranged to engage with the internal gear teeth; wherein the small tooth-difference is less than a fifth of the number of internal gear teeth; and wherein the internal gear teeth and the external gear teeth have an involute shape with no profile shift, or with a profile shift below a value at which the working pressure angles of the internal-external gear pair would exceed, by more than 20%, a nominal pressure angle of the internal-external gear pair if no profile shift were applied.

19 Claims, 14 Drawing Sheets

(56) References Cited

FOREIGN PATENT DOCUMENTS

| | | | |
|---|---|---|---|
| DE | 3606240 A1 | | 7/1987 |
| EP | 0408314 A2 | | 1/1991 |
| GB | 1198737 A | * | 7/1970 |
| KR | 920008646 B1 | * | 10/1992 |
| WO | WO-2018135552 A1 | * | 7/2018 ............... F16H 1/46 |

OTHER PUBLICATIONS

Amani, et al., "Generalised Non-Dimensional Multi-Parametric Involute Spur Gear Design Model Considering Manufacturability and Geometrical Compatibility", *Mechanism and Machine Theory*, vol. 109, pp. 250-277, Nov. 21, 2016, DOI:10.1016/J.mechmachtheory. 2016.11.012.

United Kingdom Search Report for Patent Application No. 2205215. 3, dated Oct. 10, 2022, 1 page.

\* cited by examiner

GEAR ARRANGEMENT

CROSS REFERENCE TO RELATED APPLICATIONS

This application is a National Stage Application, filed under 35 U.S.C. § 371, of International Application No. PCT/IB2023/000207, filed Apr. 7, 2023, which claims priority to GB Application No. 2205215.3, filed Apr. 8, 2022; the contents of both of which are hereby incorporated by reference in their entirety.

BACKGROUND

Related Field

The invention relates to a small tooth-difference internal-external gear pair and its use in a torque converting gearbox.

Description of Related Art

Internal-external gear pairs may have an annular gear with inwardly facing gear teeth and a relatively large pinion with outwardly facing gear teeth, located inside the annular gear. In cases of such large pinions, standard gear profiles and moduli may lead to interference between the gear tips of the two gears, known as tooth interference. Known ways to address the interference include applying a profile shift to the gear tooth profile, though profile shifting the gears may decrease efficiency of the gears.

There is a need for improved arrangements of small tooth-difference internal-external gear pairs are required.

BRIEF SUMMARY

According to a first aspect of the invention, there is provided a gearbox comprising an internal-external gear pair having a small tooth number difference, the internal-external gear pair comprising any or all of the following features: an internal gear arranged about an internal gear axis and having a first number of internal gear teeth; and an external gear having an external gear axis arranged to orbit the internal gear axis and having a second number of external gear teeth, the external gear being arranged to engage with the internal gear teeth; wherein the small tooth-difference, between the first number of external gear teeth and the second number of internal gear teeth, is less than a fifth of the number of internal gear teeth; and wherein the internal gear teeth and the external gear teeth have an involute shape with no profile shift, or with a profile shift below a value at which the pressure angles of the external gear teeth and the internal gear teeth differ by more than 20% of the working pressure angle of the external gear teeth. The internal gear teeth and the external gear teeth may have an addendum coefficient of less than 0.8. Such a gearbox may provide improved efficiency.

For any of the internal-external gear pairs disclosed, the working pressure angles of the gear pair formed by the internal gear and the external gear may exceed, by less than 20%, optionally less than 15%, 10% or 5%, the nominal pressure angle of the same gear pair if no profile shift were applied.

For any of the internal-external gear pairs disclosed, the pressure angles of the internal and external gear teeth, measured at a mid-point of the working portion of the gear tooth flanks, may be the same. Optionally, the pressure angles may differ by less than 20% of the pressure angle of the external gear teeth.

For any of the internal-external gear pairs disclosed, the internal gear teeth and the external gear teeth may have an involute shape with no profile shift, or with a profile shift below a value at which the working pressure angles of the internal-external gear pair would exceed, by more than 20%, a nominal pressure angle of the internal-external gear pair if no profile shift were applied. The internal gear teeth and the external gear teeth may have an addendum coefficient of less than 0.8. Such a gearbox may provide improved efficiency.

The sum of the addendum coefficients of the internal gear teeth and the external gear teeth of any of the gear pairs disclosed herein may be less than 1.6.

The theoretical contact ratio of the external internal gear pair, calculated for a gearbox having the same geometry and no material deformation, may be less than 1. The low contact ratio may be achieved as a consequence of having no profile shift and an addendum coefficient of below 0.8, and the contact ratio of 1 or greater following material deformation may allow the gearbox to transfer torque more consistently in practice.

The addendum coefficient may be less than 0.7, optionally less than 0.6. This may provide further clearance to avoid trochoidal interference where there may be play in the bearings and may also be necessary where the tooth difference between the external and internal gears is very small.

The addendum coefficient may be greater than 0.3 and more preferably greater than 0.5. This may allow reduced surface stresses on the flanks of the teeth, improving the lifetime of the gears.

The theoretical contact ratio of the internal-external gear pair, calculated for a gearbox having the same geometry and no material deformation, may be less than 0.8, optionally may be less than 0.6 and less than 0.4.

The profile shift coefficient of the internal gear may be less than 0.05, optionally may be less than 0.04, further optionally may be less than 0.03, still further optionally may be less than 0.02, and still further optionally may be less than 0.01. There may be no profile shift.

A pitch diameter of the external gear may be at least half the pitch diameter of the internal gear. The internal gear may cover or overlap the axis of the external gear while in contact with the teeth of the external gear.

The loaded contact ratio for the gearbox generated in use may be more than 100% greater than the theoretical contact ratio calculated for a gearbox having the same geometry and no material deformation; optionally the loaded contact ratio for the gearbox generated in use may be more than 200% greater than the theoretical contact ratio; further optionally may be more than 400% greater; still further optionally may be more than 500% greater, and still further optionally may be more than a 1000% greater. This may allow a gearbox which does not suffer from interference, due to the gears not contacting undesirably, while maintaining optimal pressure angles, and the gearbox may suffer reduced wear in use due to a high effective contact ratio spreading load effectively between different teeth. The gearbox may also exhibit increased efficiency. The profile shift may be less than 0.1.

The internal-external gear pair may have an instantaneous centre of rotation, ICR, defined as the point at which a radius drawn through the internal gear axis and the external gear axis intercepts the pitch circles of the internal and external gears, and all tooth pairs transferring load between the external and internal gears may be contained within an arc of 20 degrees centred about the ICR.

Each of the internal gear and the external gear may have 40 teeth or more.

The external gear may be a first external gear, the internal gear may be a first internal gear, and the gearbox may further comprise a second external gear coupled to the first external gear and the second internal gear movable relative to the first internal gear, the second external gear being inside the second internal gear and arranged to engage with the second internal gear. In this way, a differential planetary gearbox may be formed, providing a higher gear ratio.

The second external gear and the second internal gear may form a second small tooth number difference internal-external gear pair having a tooth difference of less than a fifth of the number of gear teeth of the second internal gear; and the second internal gear teeth and the second external gear teeth may have an involute shape with no profile shift, or with a profile shift below a value at which the respective working pressure angles of the second external gear teeth and the second internal gear teeth differ by more than 20% of the working pressure angle of the second external gear teeth; and at least one of the second internal gear teeth and the second external gear teeth may have an addendum coefficient of less than 0.8.

Generally, the first and second internal-external gear pairs may be designed substantially similarly except for a tooth difference between the first and second external gears and/or between the first and second internal gears.

The first external gear may be fixed to the second external gear and the second internal gear may be arranged to rotate relative to the first internal gear, about the internal gear axis.

Providing an input to drive the first external gear to orbit the first internal gear axis may cause an output as a relative rotation in between the first and second internal gears about the internal gear axis.

The engagement between the first internal gear and the first external gear may be axially aligned with the engagement between the second internal gear and the second external gear. Put another way, the two gear pairs may have engagements aligned in a plane normal to the axis of rotation of the gears. This may reduce twisting of the gears due to the engagement forces and may also provide a more compact gearbox.

One or both of the first and second external gears may comprise a stepped portion, such that the teeth of the gear are in a different plane from a central portion of the gear. This may allow a compact packaging of the gears.

The engagement between the first internal gear and the first external gear and the engagement between the second internal gear and the second external gear may overlap a common plane P1, which is preferably orthogonal to one or both of their axes of rotation, and may further be coplanar.

The gearbox may further comprise a third internal gear and a third external gear, the third external gear being inside the third internal gear and arranged to engage with the third internal gear, the third external gear may be coupled to the first and second external gears such that the second external gear may be between the first and third external gears, and the third internal gear may be fixed relative to the first internal gear. This may provide a symmetric gearbox, having a greater torque capacity due to axial balancing of the external gears, which may reduce twisting of the external gears.

All gears may be spur gears, that is to say non-helical gears. The teeth of the gears may be substantially parallel with the axes of rotation of the gears. It should be noted that helix angle and contact ratio are interrelated features considered together in gear design and that the described contact ratio described herein may not be replicated with helical gears.

According to a second aspect of the invention, there is provided a symmetric gearbox comprising a first gearbox according to the first aspect and a second gearbox according to the first aspect, the gearboxes of the first aspect each have a plurality of external and a plurality of internal gears, wherein the first internal gears are fixed together and the second internal gears are fixed together, and the first gearbox and the second gearbox are arranged symmetrically and coaxially.

Respective external gears of the first and second gearboxes may be arranged to orbit about the internal gear axis 180° out of phase from each other. Put another way, the respective external gears may be diametrically opposed about the internal gear axis. This may provide a more balanced set of external gears and a more balanced gearbox overall.

According to a third aspect of the invention, there is provided an internal-external gear pair comprising any or all of the following features: an internal gear, arranged about an internal gear axis and having a first number of internal gear teeth; and an external gear having an external gear axis arranged to orbit the internal gear axis and having a second number of external gear teeth, the external gear being arranged to engage with the internal gear teeth; wherein the internal gear teeth and the external gear teeth have respective pressure angles, measured at midpoints of the working portions of the gear teeth, that differ by less than 20% of the pressure angle of the external gear teeth; and wherein at least one of the internal gear teeth and the external gear teeth each have addendum coefficients of less than 0.8. The internal gear teeth and the external gear teeth may have the same pressure angles.

According to a fourth aspect of the invention, there is provided an internal-external gear pair comprising any or all of the following features: an internal gear, arranged about an internal gear axis and having a first number of internal gear teeth; and an external gear having an external gear axis arranged to orbit the internal gear axis and having a second number of external gear teeth, the external gear being arranged to engage with the internal gear teeth; wherein the internal gear teeth and the external gear teeth have standard modules and no profile shift; and wherein at least one of the internal gear teeth and the external gear teeth each have addendum coefficients of less than 0.8.

According to a fifth aspect of the invention, there is provided a gearbox comprising any or all of the following features: a first internal-external gear pair and a second internal-external gear pair, the first internal-external gear pair comprising a first internal gear and a first external gear, the first external gear being arranged inside the first internal gear and engaged with the first internal gear, and the second internal-external gear pair comprising a second internal gear and a second external gear, the second external gear being arranged inside the second internal gear and engaged with the second internal gear, the first and second internal gears being rotatable relative to one another, and the first and second external gears being fixed together, the first external gear having a stepped portion such that the engagement of the first internal gear with the first external gear and the engagement of the second internal gear with the second external gear overlap at least partially in a common plane.

This may provide a more compact gearbox and twisting on the external gears may be reduced as the offset between the external gears may be reduced.

The first and second internal gears may be rotatable about a first axis, the first and second external gears may orbit the first axis, and/or the common plane may be normal to the first axis.

The first and second external gears may form a compound pinion gear, and the compound pinion gear may have a recess for at least partially receiving the second internal gear. The second internal gear may be entirely received in the recess.

The engagement of the first internal gear with the first external gear and the engagement of the second internal gear with the second external gear may be coplanar. Overall, the teeth of the first internal gear, the second internal gear, the first external gear and the second external gear may be coplanar.

The gearbox may further comprise a crank-shaped input shaft arranged to move the first and second external gears. The input shaft may be used to impart torque to the gearbox. One of the internal gears may be fixed and one of the internal gears may be moveable, such that torque may be output from the moveable internal gear.

The gears of the gearbox of the fifth aspect of the invention may have teeth comprising any or all features of the teeth described with reference to any other aspect of the invention.

Any feature or features of the third and/or fourth aspects of the invention may be combined with any of the above-described properties and features of the first and second aspects of the invention. Any or all features of the fifth aspect of the invention may be combined with any of the above-described properties and features of the first to fourth aspects of the invention.

DETAILED DESCRIPTION OF VARIOUS EMBODIMENTS

Small tooth difference internal-external gear pairs can be of use when creating high ratio gearboxes or torque converters. Such gear pairs can be used in two stage pairs, in order to create a high ratio gearbox which can turn a relatively high-speed low torque input into a low speed, high torque output. Efficiency is such gearboxes can vary depending on how the tooth profiles are arranged. Additionally, the ability to drive a high ratio gearbox in the reverse sense—i.e. applying a low speed high torque input to the output, to create a relatively high speed low torque output at the input, can be important in certain applications. This can be referred to as back-driveability of the gearbox. Minimising losses in the gearbox is important in enabling the back-driveability and overall efficiency of the gearbox in either driving direction. The inventor has identified that long-held standard approaches to gear design in small tooth difference internal external gear pairs can give results which are detrimental to the overall performance of the gear pair.

Figure 1:
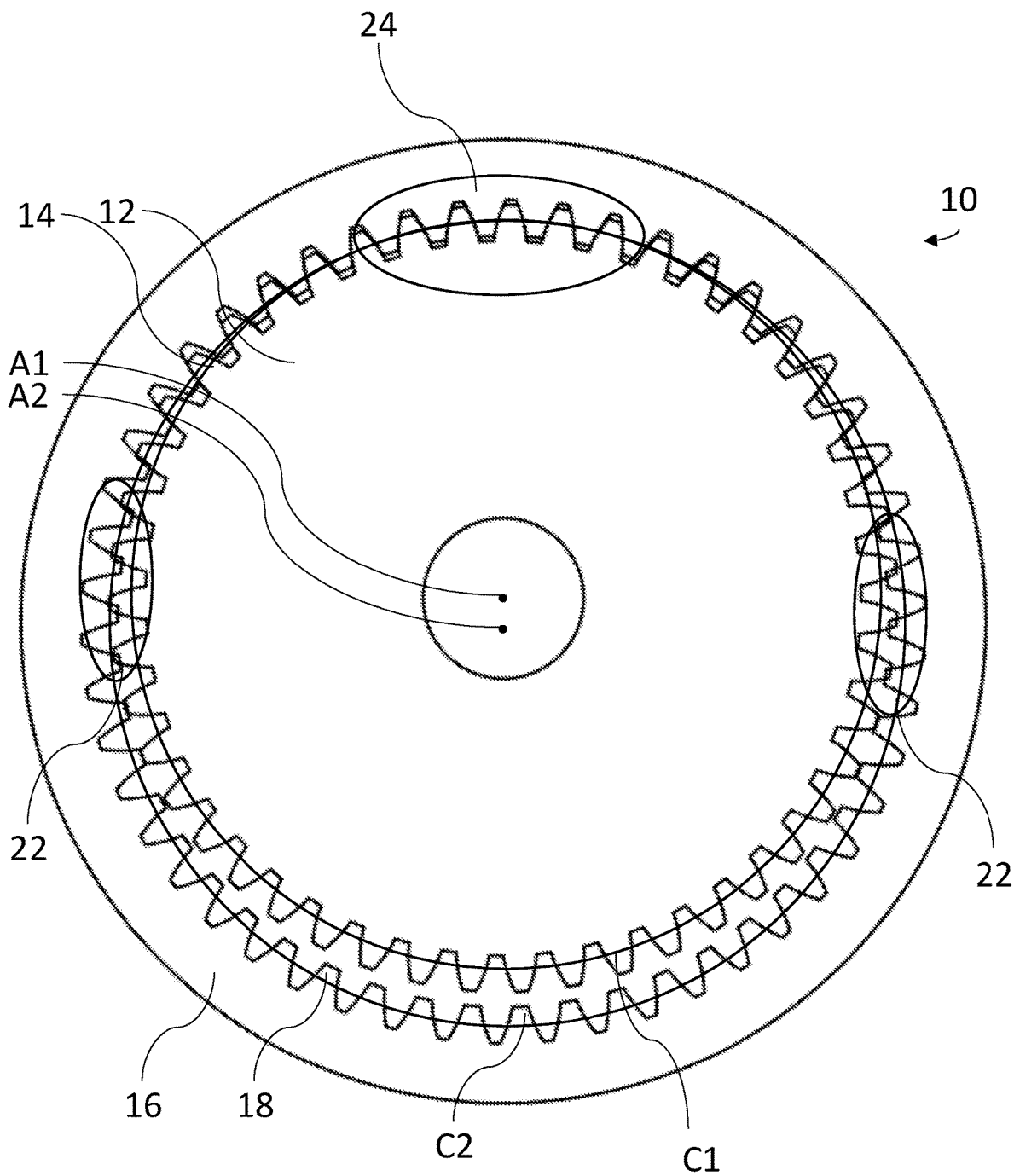
FIG. 1 shows a small tooth difference internal-external gear pair exhibiting trochoidal interference.

When providing such a gearbox having an internal gear and an external gear with a relatively small difference between the numbers of teeth on each gear, an issue may arise that the teeth of the two gears may interfere, as shown in FIG. 1.

FIG. 1 shows a gearing arrangement 10 having an inner gear 12 and an outer gear 16, the inner gear 12 having 47 teeth 14 and a pitch circle C1, the inner gear teeth 14 being arranged to engage with outer gear teeth 18 of the outer gear 16, the outer ring gear 16 having 50 outer teeth 18 and a pitch circle C2.

It will be understood that various different terms may be used for the gears. The inner gear 12 may be referred to as a pinion, a spur gear or an external gear, since the gear teeth face externally. Similarly, the outer gear 14 may be referred to as an annular gear, a ring gear or an internal gear, as the gear teeth face internally. The inner gear 12 and the outer gear 14 may both be straight-cut gears, i.e. non-helical gears.

The internal gear 16 is centred around an internal gear axis A2, and the external gear 12 is centred on an external gear axis A1. It will be understood that, in suitable arrangements, the external gear 12 may orbit the internal gear axis A2 as the external gear 12 is rotated. In some arrangements, the external and internal gear axes A1, A2 may be kept stationary and the external and internal gears 12, 16 may each rotate about their respective axis A1, A2. Kinematic configurations for gearboxes using internal-external gear pairs are discussed in further detail in relation to later Figures.

In an engagement region 24, the teeth 14 of the external gear 12 engage the internal gear teeth 18. In this region, the flanks of the respective teeth 14, 18 contact each other, transferring torque between the two gears 12, 16.

The teeth of FIG. 1 are designed with standard modules and involutes (standard gear modules being in accordance with the well-known Japanese Industrial Standard JIS B 1701 (1973), the gear details of which are incorporated below for reference). Standard gear teeth will also have a nominal pressure angle of 20°. JIS B 1701 specifies tooth profiles and dimensions of involute spur gears and helical gears of general use. The sizes of teeth are expressed in module m. The standard values of module m are given in Table 1 below, using the units mm. Preferably the standard module is a module of any of series No. 1, No. 2 and No. 3.

TABLE 1

Standard Values of Module

| Series No. 1 | Series No. 2 | Series No. 3 | Series No. 1 | Series No. 2 | Series No. 3 |
|---|---|---|---|---|---|
| 0.1 | | | | 3.5 | |
| | 0.15 | | | | 3.75 |
| 0.2 | | | 4 | | |
| | 0.25 | | | 4.5 | |
| 0.3 | | | 5 | | |
| | 0.35 | | | 5.5 | |
| 0.4 | | | 6 | | |
| | 0.45 | | | | 6.5 |
| 0.5 | | | | 7 | |
| | 0.55 | | 8 | | |
| 0.6 | | | | 9 | |
| | | 0.65 | 10 | | |
| | 0.7 | | | 11 | |
| | 0.75 | | 12 | | |
| 0.8 | | | | 14 | |
| | 0.9 | | 16 | | |
| 1 | | | | 18 | |
| 1.25 | | | 20 | | |
| 1.5 | | | | 22 | |
| | 1.75 | | 25 | | |
| 2 | | | | 28 | |
| | 2.25 | | 32 | | |
| 2.5 | | | | 36 | |
| | 2.75 | | 40 | | |
| 3 | | | | 45 | |
| | | 3.25 | 50 | | |

The tooth profile curves shall be an involute curve with the standard pressure angle $\alpha_0$ being 20°, and the dimensions shall be as specified in Table 2. However, the profile modification is unspecified in this standard. Other standard tooth profiles may have pressure angles including 25° as well as 14.5°, 20°, 22.5°, 25° and 30°.

TABLE 2

Dimensions of involute spur gears and helical gears

| | Spur gear | | Helical gear — Normal system | | Helical gear — Transverse system | |
|---|---|---|---|---|---|---|
| Item | Standard Gear | Profile Shifted Gear | Standard Gear | Profile Shifted Gear | Standard gear | Profile shifted gear |
| Module | m | | $m_x$ | | $m_s$ | |
| Standard pressure angle | $a_0 = 20°$ | | $a_x = 20°$ | | $a_s = 20°$ | |
| Standard pitch circle diameter | zm | | $zm_x / \cos \beta_0$ | | $zm_s$ | |
| Whole depth | h ≥ 2.25 m | | h ≥ 2.25 $m_x$ | | h ≥ 2.25 ms | |
| Amount of addendum modification | 0 | xm | 0 | $x_n m_x$ | 0 | $x_s m_s$ |
| Addendum | m | (1 + x)m | $m_x$ | $(1 + x_n)m_x$ | $m_s$ | $(1 + x_s)m_s$ |
| Transverse circular thickness | $\frac{\pi m_n}{2}$ | $\left(\frac{\pi}{2} \pm 2x \tan a_0\right)m$ | $\frac{\pi m_n}{2\cos\beta_0}$ | $\left(\frac{\pi}{2} \pm 2x \tan a_x\right)\frac{m_x}{\cos\beta_0}$ | $\frac{\pi m_s}{2}$ | $\left(\frac{\pi}{2} \pm 2x_s \tan a_s\right)m_s$ |

The profile shift coefficient may be calculated based on the working pressure angle, $\alpha_w$, the nominal pressure angle, $\alpha$, (the nominal pressure angle according to accepted standards usually being 20°, as well as the other examples provided above), the involute function, inv, for the relevant angles and the number of teeth $z_1$ of the internal gear and $z_2$ of the external gear. For helical gears, the helix angle $\beta$ may also be used. The below equation may be used to determine the profile shift coefficient $x_1$ for a first gear, and it will be understood that a rearrangement may be used to determine the profile shift coefficient $x_2$ of a second gear.

$$x_1 = x_2 - \left(\frac{inv\alpha_w - inv\alpha}{2\tan\alpha}\right)(z_2 - z_1)$$

The centre distance, $\alpha$, for internal-external gear pairs may be determined using the below equation, where m is the gear module and y is a centre distance increment factor.

$$a = \left(\frac{z_1 - z_2}{2} + y\right)m$$

The centre distance increment factor may in turn be determined by the equation below.

$$y = \frac{z_1 - z_2}{2}\left(\frac{\cos\alpha}{\cos\alpha_w} - 1\right)$$

The use of the described standard gears may result in trochoidal interference, since the tips of the external gear teeth 14 may contact the tips of the internal gear teeth 18 outside the region 24 where contact is intended. This can be seen in regions 22 labelled on FIG. 1. Trochoidal interference may be fatal to a gearbox and, in the case illustrated in FIG. 1, may fundamentally prevent the gearbox from being constructed.

Figure 2:
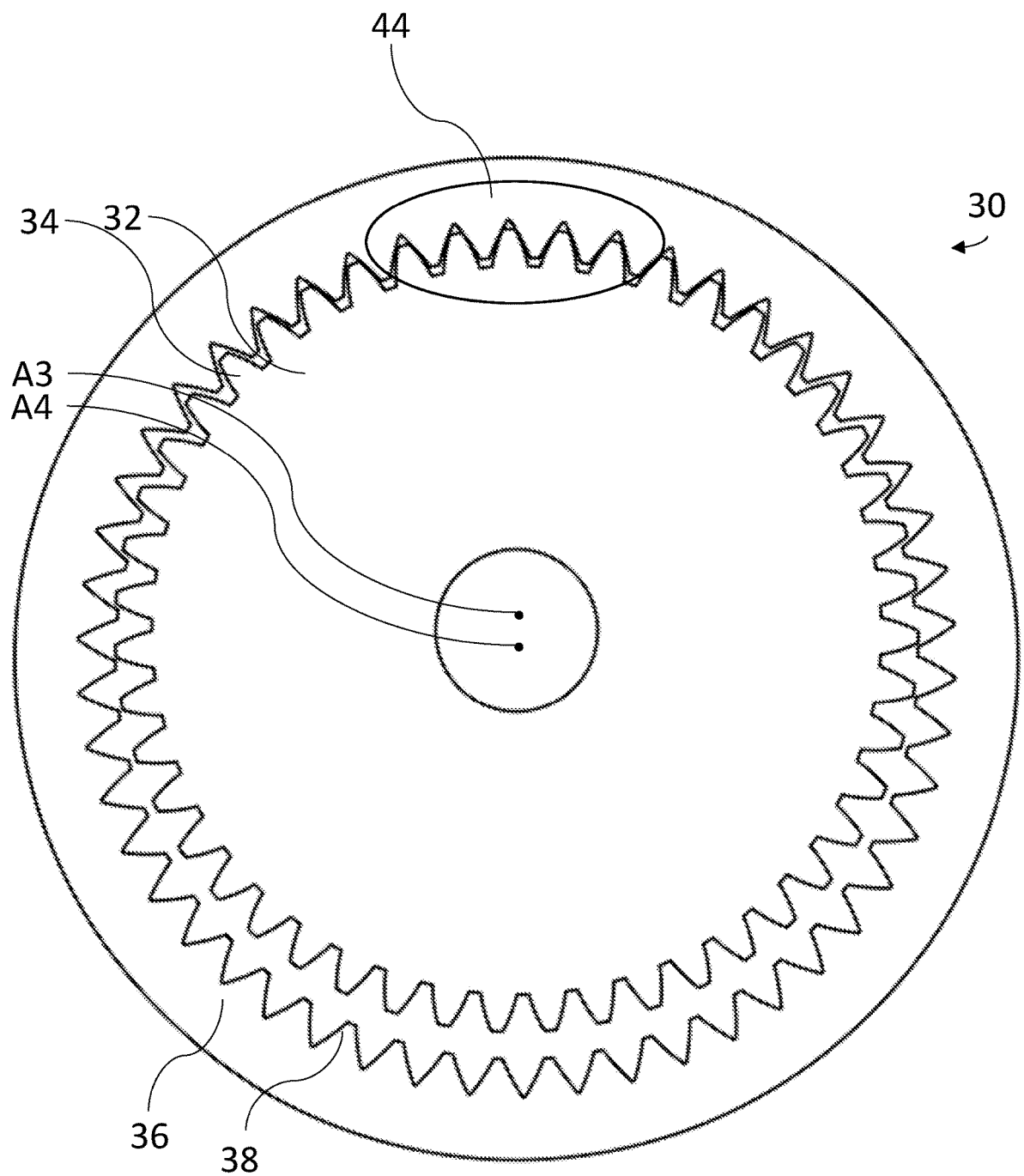
FIG. 2 shows a small tooth difference internal-external gear pair exhibiting a profile shift and no trochoidal interference.

In order to avoid trochoidal interference, a common solution is for gears to be profile shifted. One example of a profile shifted gear tooth profile, used to avoid trochoidal interference is shown in FIG. 2. Gearing arrangement 30 shows an external gear 32 having 47 externally facing gear teeth 34 arranged about an external gear axis A3.

Outside the external gear 32, which may also be referred to as a pinion, there is an internal gear 36. The internal gear 36 has internally facing gear teeth 38, which are arranged to contact the externally facing gear teeth 34 in a contact region 44.

Conventional gear design may involve the selection of a centre distance between two gears (i.e. a distance between their axes) and a number of teeth on each gear, determined by the desired gearing ratio. In the case of two spur gears, the pitch diameters of the respective gears will conventionally be selected such that the pitch diameters sum to twice the centre distance and the ratio of the two pitch diameters will be the same as the ratio of the tooth numbers (i.e. the gear ratio). In the case of internal-external gear pairs, the difference in pitch diameters may be twice the centre distance of the gears. The pitch diameters determined in this way may be described as the nominal pitch diameters.

A profile shift of a gear involves moving the cutting tool closer to or further from the gears during cutting, to adjust the working pitch diameter of a gear. Therefore, a profile shifted gear may have a working pitch diameter different from its nominal pitch diameter.

Since the same cutting tool may be used, the base circle of the involute describing the tooth flank remains the same during a profile shift. However, a profile shift effectively alters the portion of the involute that describes the tooth flank, moving the portion of the involute closer to or further from the base circle.

It can be seen that there is no trochoidal interference between the external and internal gear teeth 34, 38. This is due to a profile shift that has been applied to the gear teeth. A profile shift involves altering a standard gear cutter such that the involute shape of the gear teeth remains the same and the base circle of the involute remains in the same position. Profile shifting therefore changes the pitch circle of the gears, from a nominal pitch circle with a standard profile, to a shifted profile. However, profile shifting of a gear increases the working pressure angle of the gear and one effect of that is a decrease in the efficiency of the gear.

Consequently, the profile-shifted gears of FIG. 2 have a working pressure angle different from the nominal pressure angle for the standard involute profile of 20° (in the case of FIG. 2, the working pressure angle is 37.42°). The profile shifted teeth of FIG. 2 also have a standard addendum coefficient of 1. The higher working pressure-angle may lead to a reduced bearing life and a lower efficiency of the gearbox, due to the higher sliding velocities between the teeth 34 and the teeth 38 while they are carrying load in the meshing region 44.

Figure 3:
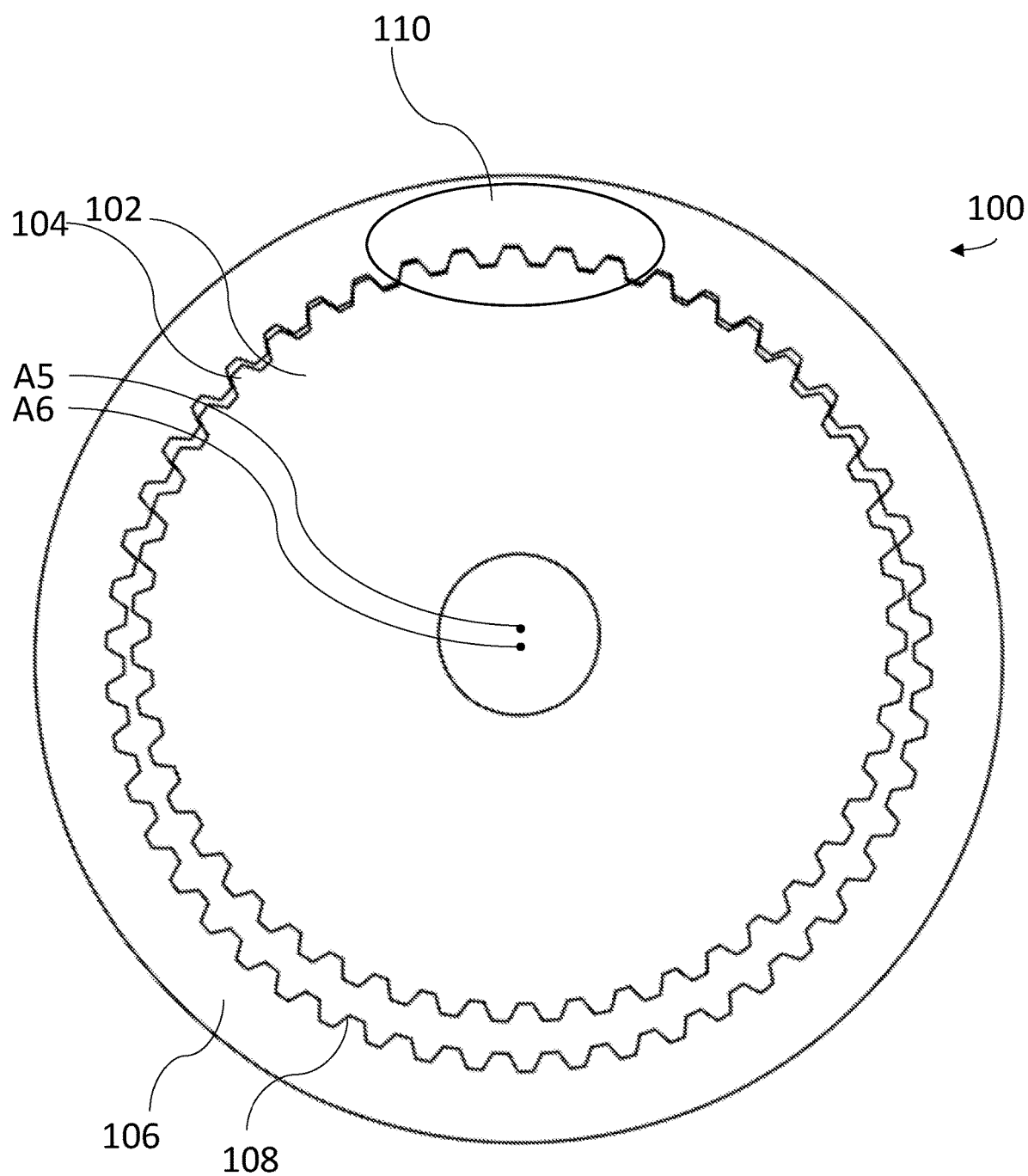
FIG. 3 shows a small tooth difference internal-external gear pair exhibiting no profile shift and a low addendum coefficient and no trochoidal interference.

FIG. 3 shows a gearing arrangement 100, which is intended to avoid the issue of trochoidal interference while maintaining a high efficiency. The gearing arrangement 100 has an internal or annular gear 106. The example shown has 50 internally facing gear teeth 108, but other tooth numbers can be envisaged. The example also has an external or pinion gear 102 having 47 externally facing gear teeth 104, though other external gears with a small difference in the number of teeth from that of the internal gear 106 can be envisaged. Generally, the interference issue noted above with reference to FIG. 1 occurs where internal-external gear pairs are constructed having a small difference in the number of teeth between the internal gear and the external gear, for example a difference of less than 5 teeth or a difference of around a fifth of the number of teeth of the internal gear, for example.

The internal gear 106 is arranged about an internal gear axis A6 and the external gear 102 is arranged about an external gear axis A5. It will be understood that where the internal gear 106 may be held stationary, the external gear 102 may be rotated and may orbit the external gear axis A6.

While the gears shown in FIG. 3 have a particular number of teeth, with the internal gear 106 having 50 teeth 108 and the external gear 102 having 47 teeth 104, it will be understood that the external and internal gears may have any number of teeth where there is a relatively small difference between the numbers of teeth. For example, the difference between the number of teeth may be less than 5, such that the internal gear 106 has less than 5 more teeth than the external gear 102. Alternatively, the difference may be considered as a percentage, and the difference in tooth number may be less than 20%, or one fifth, of the number of teeth of the internal gear, optionally less than 10%, or one tenth of the number of teeth of the internal gear.

In the gearing arrangement 100, trochoidal interference has been avoided by modification of the addendum coefficient. The gears exhibit no profile shift, which can be determined by the fact that the pressure angle at the point M located at the middle of the active profile, measured as the angle between the normal line to the tooth flank and the tangent line to the circle centred at the centre of the gear and passing through this same point M, is the same for both gears. The pressure angles of the two gears at the point M may vary by up to 20% without a significant impact on the working principle of providing no profile shift. The lack of a profile shift may also in certain cases be determined due to the use of a standard module and the pressure angle of the gear teeth being a standard pressure angle. A standard module may be such as defined above with reference to FIG. 1 and Japanese Industrial Standard JIS B 1701 (1973). Specifically, the addendum coefficient of both of the external gear teeth 104 and internal gear teeth 108 is less than 0.8. However, the addendum coefficients may be different on the external and internal gear teeth 104, 108. This may be referred to as an asymmetric addendum coefficient. Generally, the sum of the addendum coefficients may be less than 1.6 in order to avoid trochoidal interference. Further, the sum of the addendum coefficients may be greater than 0.6 since smaller addendum coefficients may lead to excessive surface pressure under load, which is undesirable. Therefore, the sum of the addendum coefficients of the external and internal gear teeth may be between 0.6 and 1.6. More preferably, the sum of the addendum coefficients is between 1 and 1.6.

In previous gear design techniques and associated literature, it has long been the general belief that reducing the addendum coefficient in a gear pair below 0.8 will undesirably reduce the contact ratio. The contact ratio is the average number of gear teeth of either gear that is in contact with a tooth of the other gear at any one time. Therefore, where the contact ratio is below 1, the gearing arrangement has time periods at which no gears are in contact, meaning that the gears are effectively unable to mesh properly, i.e. in a smooth and effective manner. This can lead to inconsistent torque transfer between the gears, juddering, and damage to the gear teeth. For these reasons, a contact ratio below 1 is generally considered as being undesirable and common practice and gear design literature teaches away from a contact ratio below 1.

In the arrangement of FIG. 3, the theoretical contact ratio, i.e. the contact ratio that would be calculated on the basis of undeformed teeth in their resting state, would be less than 1. However, due to deformation of the teeth under load, i.e. while torque is being transferred by the gears, the contact ratio may increase to 1 or may increase above 1. This contact ratio may be referred to as the loaded contact ratio. Therefore, while the gearbox may initially appear to be unworkable, it may work in practical situations. The deformation under load will be easily understood to a skilled person at least in the limiting case, which is where the strain is below the ultimate tensile strain. For most gearboxes having a contact ratio below 1, the contact ratio will not increase to 1 even when the material is deformed to the greatest extent possible without causing plastic deformation or failure. However, in the present case, the contact ratio may alter from below 1 to above 1 due to elastic deformation of the gear teeth.

Figure 4A:
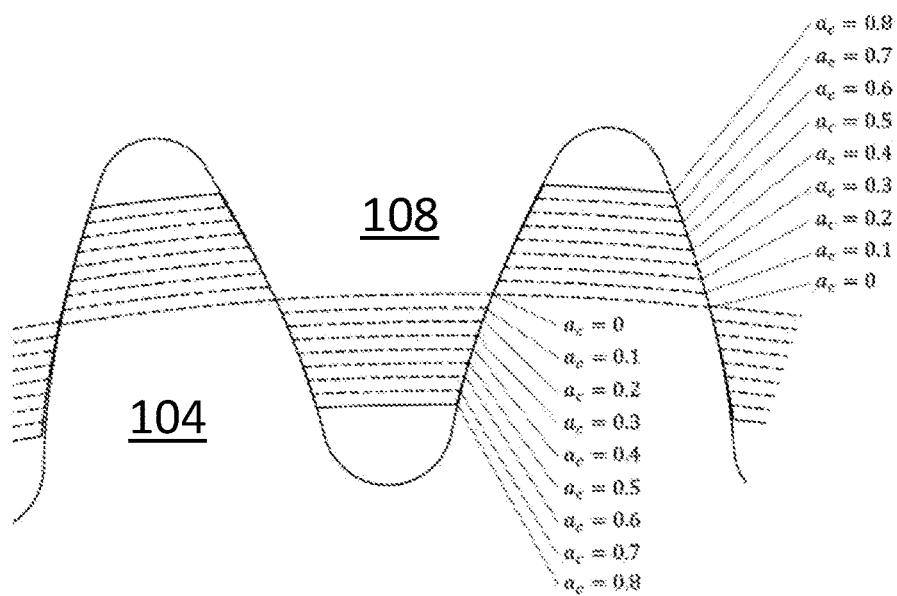
FIG. 4 illustrates a variation in gear tooth profile with changing addendum coefficient.
Figure 4B:
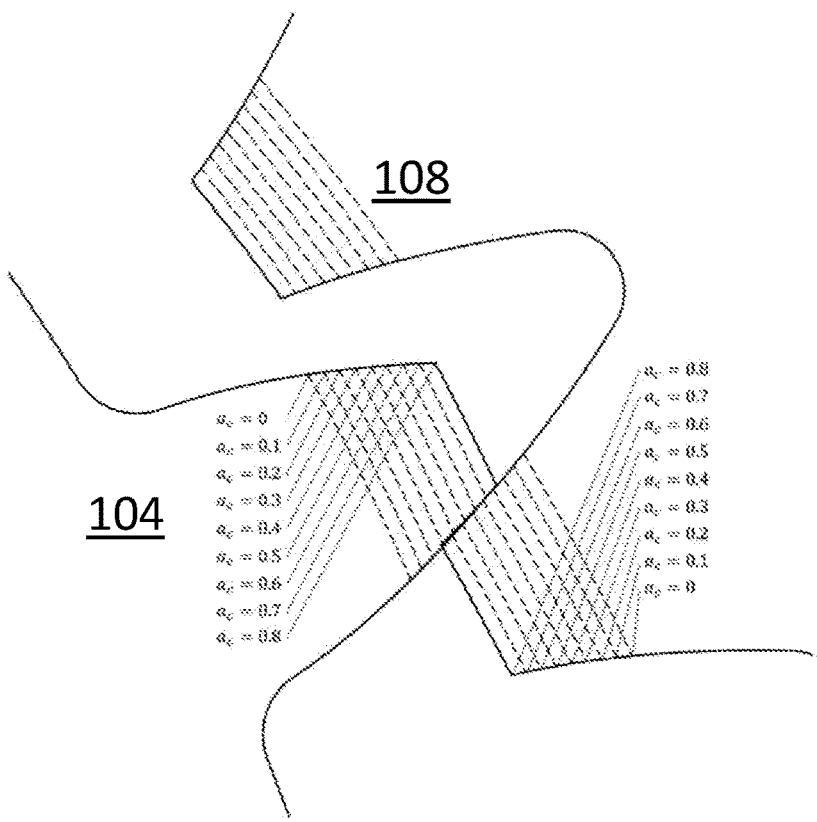

FIGS. 4a and 4b illustrate the variation in shape of a gear tooth with changing addendum coefficient $a_c$ for an internal gear tooth 108 and also for an external gear tooth 104. From FIGS. 4a and 4b, it can be seen that the base circle of the involute and the pitch circle remain constant, as does the module of the gear teeth. In this way, the pressure angle also remains at a constant, nominal pressure angle. Effectively, reduction of the addendum coefficient crops the teeth by removing the top portion of the teeth. As shown by FIG. 4b, contact with the tips of the teeth may therefore be avoided without altering the desirable pressure angle provided by the tooth shape.

The addendum of a gear tooth is the distance a gear tooth protrudes beyond the pitch circle, which can be seen at $a_c=0$. The addendum coefficient $a_c$ is the dimensionless number obtained by dividing the addendum by the module of the tooth. While a conventional addendum coefficient is 1, it can be seen that a reduction in the addendum coefficient may reduce the prospect of interference between tips of the gear teeth. It may therefore be advantageous to design gears having an addendum coefficient below 0.8, or optionally even lower.

FIGS. 5a to 6c are provided in order to demonstrate more clearly how a profile shift may be determined.

Figure 5A:
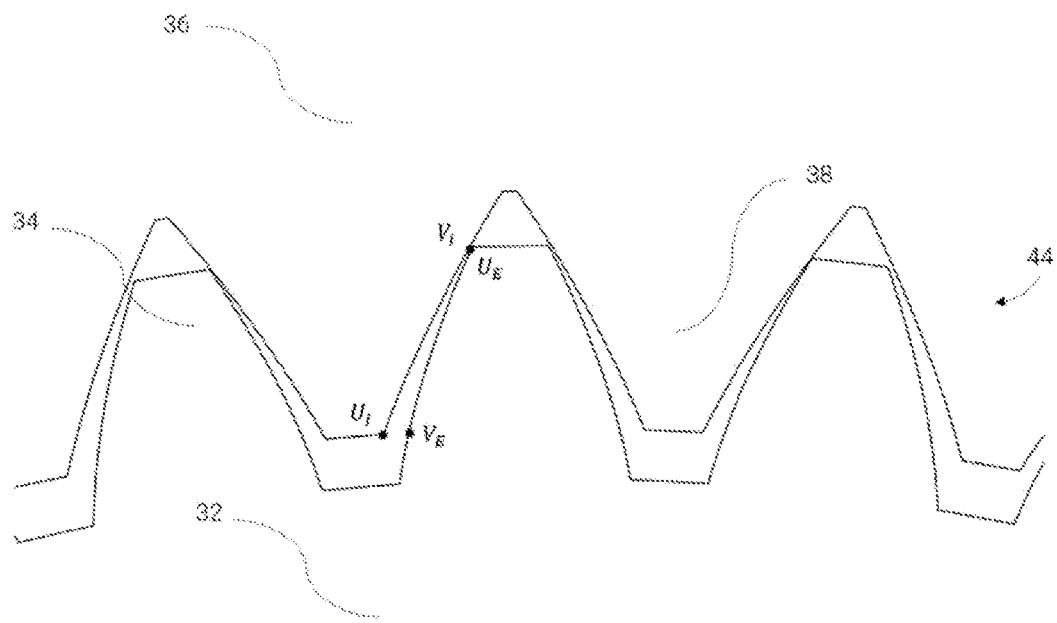
FIGS. 5a to 5c show profile shifted gears with certain geometric properties labelled.

FIG. 5a shows the profile shifted gears of FIG. 2 in the meshing region 44. A working portion of the internal gear tooth 38 is delimited by points $V_I$ and $U_I$. $V_I$ is the point on the internal gear tooth 38 that is on the outer radius of the external gear 32, and so contacts the tip of the external gear tooth 34. $U_I$ is the tip of the internal gear tooth 38. Similarly, points $U_E$ and $V_E$ are defined for the external gear tooth 34. $U_E$ is the tip of the external gear tooth 34 and $V_E$ is the location on the external gear tooth 34 that contacts the tip of the internal gear tooth 38. $V_E$ is also the tangential projection of the point $U_I$ when gear teeth 34 and 38 are in the meshing region. It will therefore be understood that the only portion of the tooth flanks that contact each other are the working portions of the teeth, as defined by points $U_I$, $V_I$, $U_E$, and $U_E$.

Figure 5B:
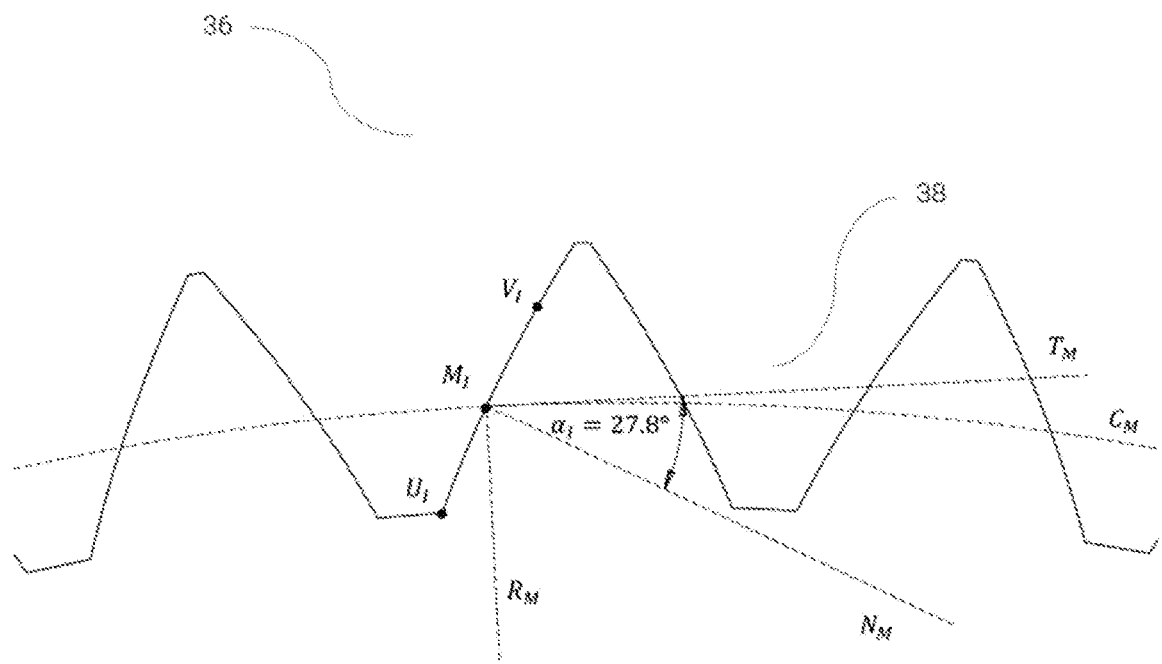

Turning to FIG. 5b, a further point $M_I$ is defined on the internal gear 36. $M_I$ is a midpoint between $U_I$ and $V_I$. The pressure angle $\alpha_I$ is defined at the midpoint as the angle between the tangent $T_M$ to the circle $C_M$, which is centred on the gear axis, and the normal to the tooth flank $N_M$ at $M_I$. For completeness, the radius $R_M$ of the circle $C_M$ is also shown. The angle $\alpha_I$ may be described as the working pressure angle as it is measured in the middle of the working portion of the tooth.

Figures 5C, 6A:
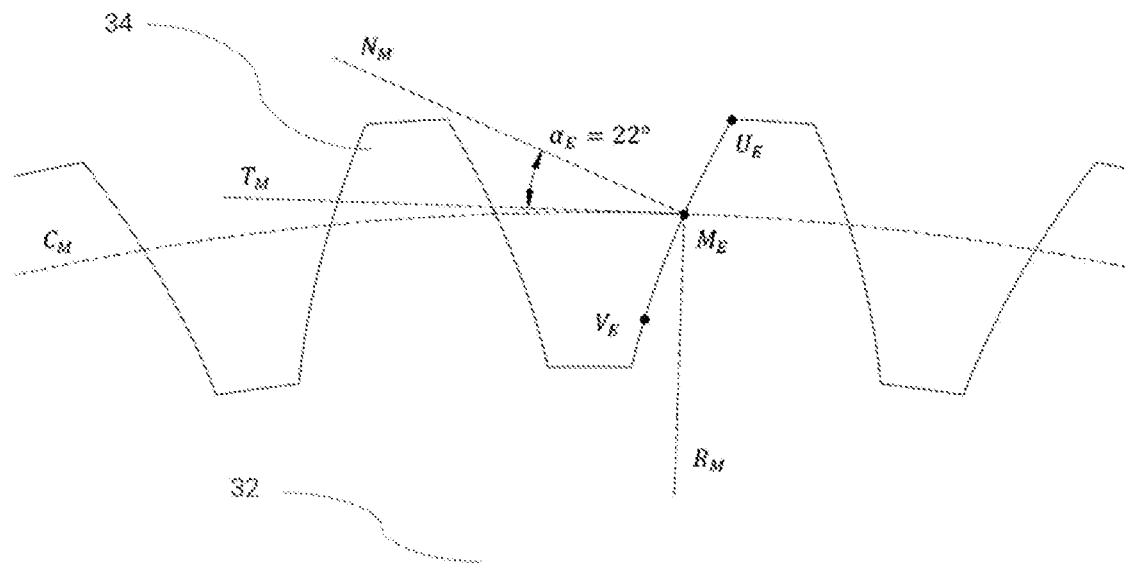
FIGS. 6a to 6c shown gears with no profile shift with certain geometric properties labelled.

FIG. 5c shows equivalent points on the external gear 32. A further point $M_E$ is defined. $M_E$ is a midpoint midway between $U_E$ and $V_E$. The pressure angle $\alpha_E$ is defined at the midpoint as the angle between the tangent $T_M$ to the circle $C_M$, which is centred on the gear axis, and the normal to the tooth flank $N_M$ at $M_E$. For completeness, the radius $R_M$ of the circle $C_M$ is also shown. The angle $\alpha_E$ may be described as the working pressure angle as it is measured in the middle of the working portion of the tooth.

By comparing the pressure angles of the two gears, measured at the respective midpoints $M_I$ and $M_E$ of the respective working portions of the respective internal and external gears, as described above, it can be seen that the pressure angles differ by more than 20% of the pressure angle of the external gear. Therefore, the gears exhibit a profile shift.

FIG. 6a shows the gears of FIG. 3 in the meshing region 110, where the gears have no profile shift. A working portion of the internal gear tooth 108 is delimited by points $V_I$ and $U_I$. $V_I$ is the point on the internal gear tooth 108 that is on the outer radius of the external gear 102, and so contacts the tip of the external gear tooth 104. $U_I$ is the tip of the internal gear tooth 108. Similarly, points $U_E$ and $V_E$ are defined for the external gear tooth 104. $U_E$ is the tip of the external gear tooth 104 and $V_E$ is the location on the external gear tooth 104 that contacts the tip of the internal gear tooth 108. It will therefore be understood that the only portion of the tooth flanks that contact each other are the working portions of the teeth, as defined by the regions between points $U_I$, $V_I$, $U_E$, and $U_E$.

Figure 6B:
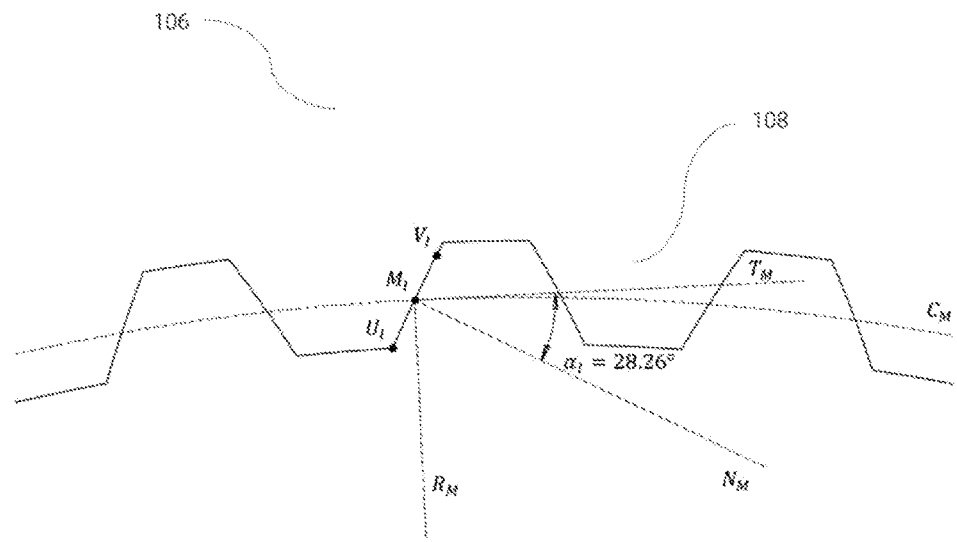

Turning to FIG. 6b, a further point $M_I$ is defined on the internal gear 106. $M_I$ is a midpoint between $U_I$ and $V_I$. The pressure angle $\alpha_I$ is defined at the midpoint as the angle between the tangent $T_M$ to the circle $C_M$, which is centred on the gear axis, and the normal to the tooth flank $N_M$ at $M_I$. For completeness, the radius $R_M$ of the circle $C_M$ is also shown. The angle $\alpha_I$ may be described as the working pressure angle as it is measured in the middle of the working portion of the tooth.

Figure 6C:
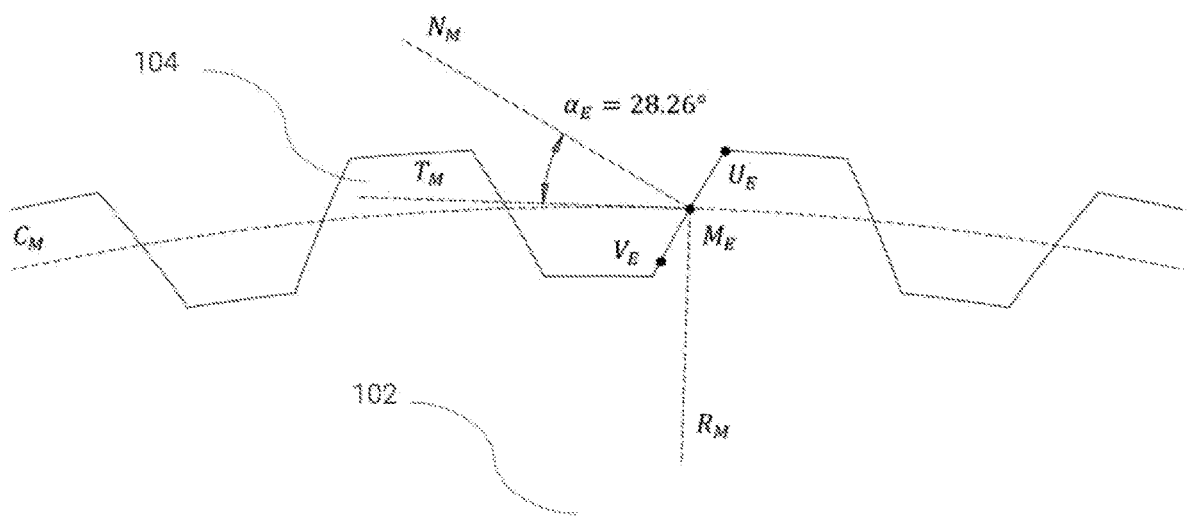

FIG. 6c shows equivalent points on the external gear 102. A further point $M_E$ is defined. $M_E$ is a midpoint between $U_E$ and VE. The pressure angle $\alpha_E$ is defined at the midpoint as the angle between the tangent $T_M$ to the circle $C_M$, which is centred on the gear axis, and the normal to the tooth flank $N_M$ at $M_E$. For completeness, the radius $R_M$ of the circle $C_M$ is also shown. The angle de may be described as the working pressure angle as it is measured in the middle of the working portion of the tooth.

As can be seen from FIGS. 6b and 6c, the pressure angles at the midpoints of the working portions of the internal and external gear teeth are the same.

As can be seen from the above explanation, the following becomes apparent. A presence of profile shift can be detected by detection of a difference between pressure angles of the internal and external gear teeth. A pressure angle of the internal gear teeth at a midpoint of the working portion of the internal gear teeth can be determined. A pressure angle of the external gear teeth at a midpoint of the working portion of the external gear teeth can be determined. A difference between the determined pressure angles can be determined. A difference between working pressure angles of the internal and external gears can be determined. The difference in pressure angles may be determined at the respective midpoints of the working portions of the respective internal and external gear teeth.

In the case of the present disclosure, a difference in the measured pressure angles between the internal and external gear teeth is advantageously less than 20% of the pressure angle of the pressure angle of the internal or external gear teeth. This indicates a degree of profile shift which has minimal impact on the efficiency of the gear pair. It can be further advantageous to limit the difference in pressure angles to lower figures, such as 15%, 10%, or 5%, or less. These lower figures further limit the effect on efficiency of the gear pair due to the profile shift and/or pressure angle difference.

Figure 7:
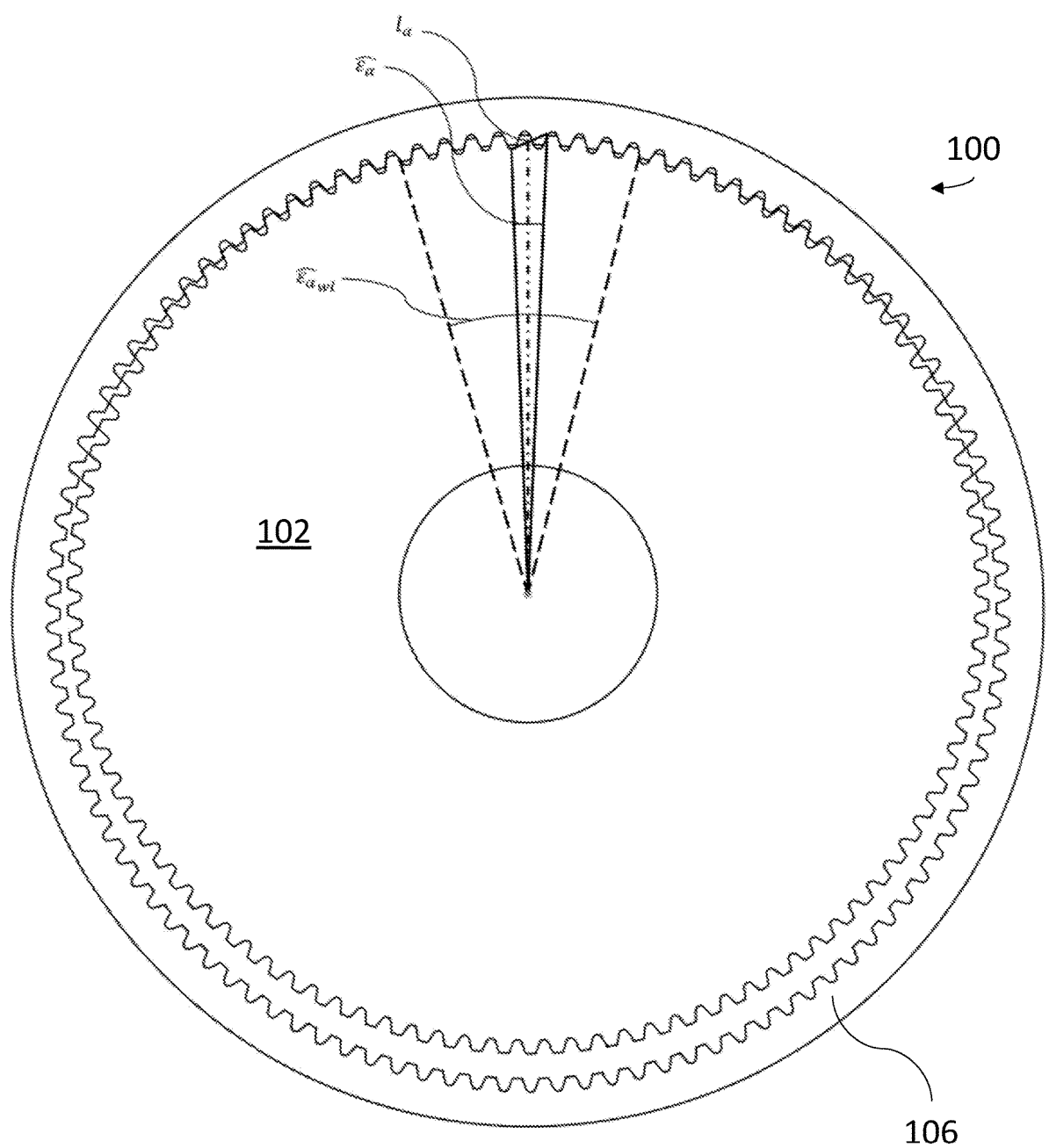
FIG. 7 illustrates an instantaneous centre of rotation of an internal-external gear pair, showing the teeth in contact at one time.

FIG. 7 shows the gearbox 100 with a line of action $l_\alpha$ labelled. $l_\alpha$ describes the gear teeth that are in contact and transferring load at any instant. The line of action $l_\alpha$ is centred on the instantaneous centre of rotation, ICR, of the gearbox, which is a point on the pitch circle about which the external gear 104 may be said to rotate, given the assumption that the internal gear 108 is fixed. The ICR is the point at the intersection of the line described by the two gear axes and one or other of the pitch circles. It is also the location at which the pitch circles touch. The angle of action $\widehat{\varepsilon}_\alpha$ describes the angle defined by the line of action $l_\alpha$ and the external gear axis. The angle of action is preferably less than 20°, as indicated by the maximum angle of action $\varepsilon_{\alpha_{wl}}$. It is preferable that the loading on the gearbox is within this range in order to avoid losses of efficiency due to friction.

FIGS. 8a to 11 illustrate gearboxes in which various forms of gear teeth may be implemented. In particular, one or more features of the internal-external gear pairs described in the present disclosure may be advantageously implemented in the illustrated gearboxes.

Figure 8A:
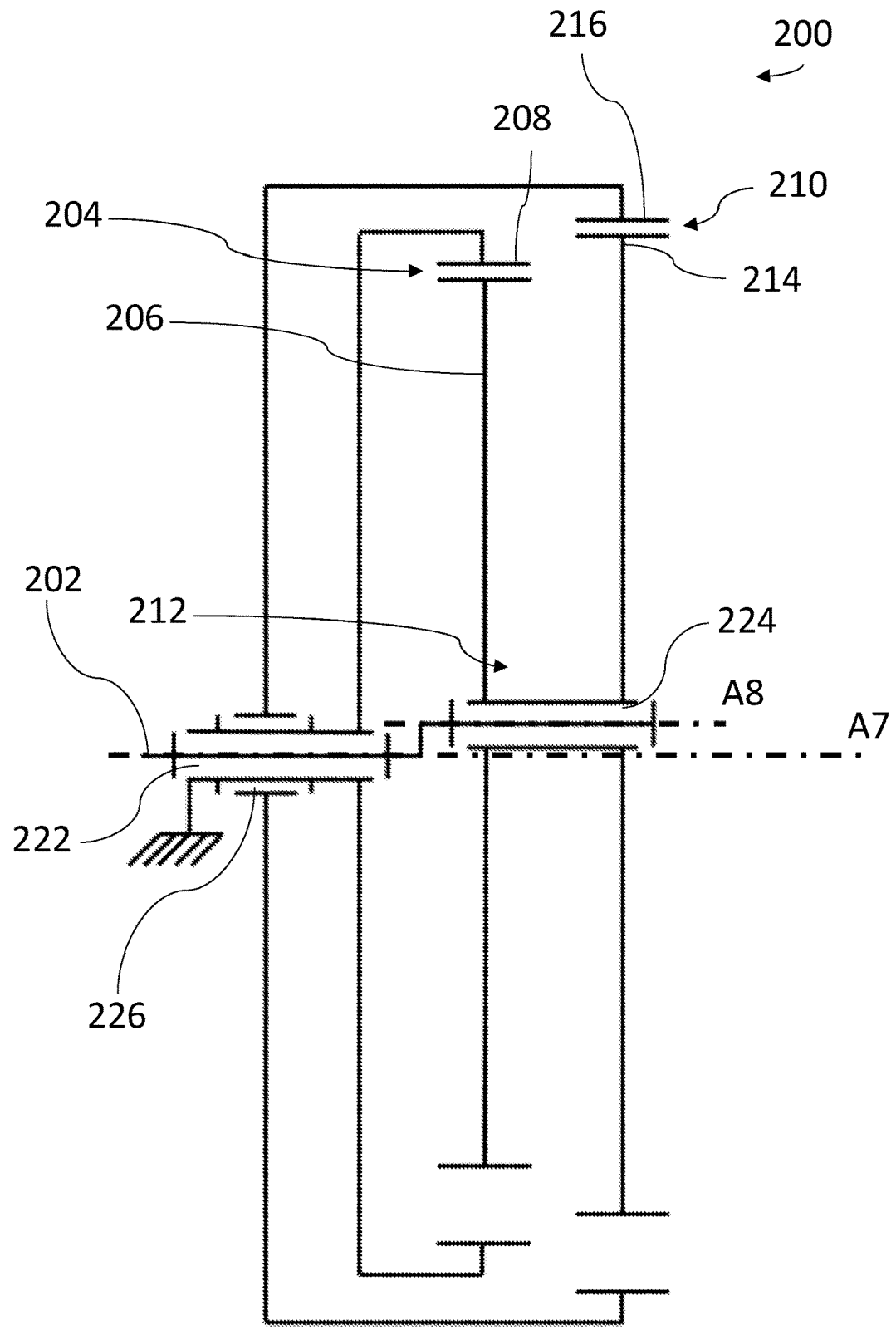
FIG. 8a is a schematic drawing showing a first gearbox according to embodiments of the invention.
Figure 8B:
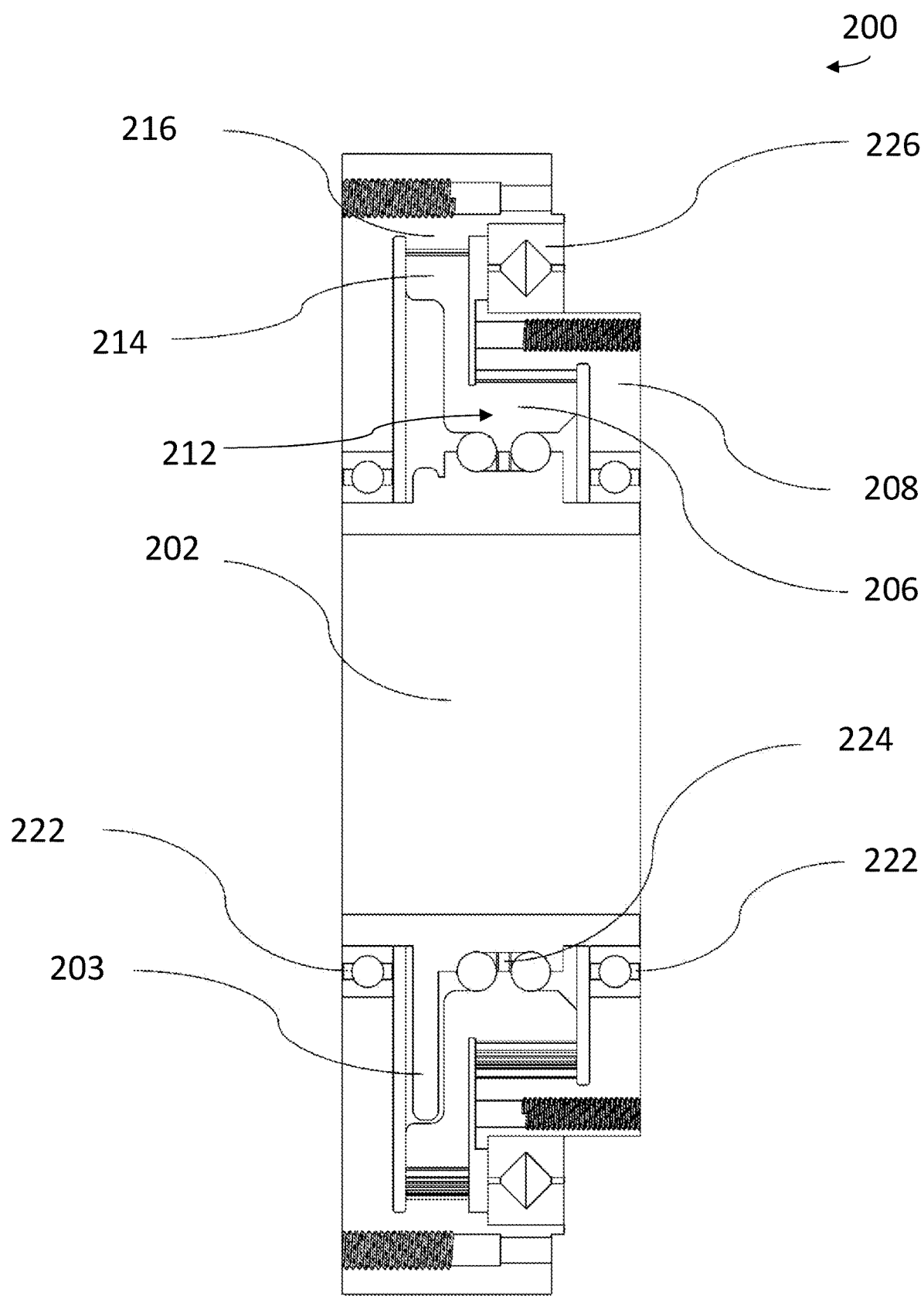
FIG. 8b is a cross sectional drawing showing the first gearbox according to embodiments of the invention.

FIGS. 8a and 8b show, respectively, a schematic and a cross-sectional view of a first gearbox 200 in which the internal-external gear pairs described in the present description may be advantageously implemented. The illustrated example comprises two internal-external gear pairs: a first gear pair 204 and a second gear pair 210. These gear pairs may be gear pairs of the type described above with reference to FIG. 3 and in particular the teeth of the gears of the gear pairs may have no profile shift, or small profile shift such that the working pressure angles of the gear teeth do not exceed, by more than 20%, a nominal pressure angle of the gear teeth if no profile shift were applied, and an addendum coefficient below 0.8.

The gearbox has a first internal-external gear pair 204 having an external, pinion gear 206 and an internal, annular gear 208. The gearbox 200 also has a second internal-external gear pair 210, which in turn comprises an external, pinion gear 214 and an internal, annular gear 216. The external, pinion gear 214 of the second internal-external gear pair 210 is rigidly fixed to the external, pinion gear 206 of the first internal-external gear pair 204. Consequently, the two external, pinion gears 214, 206 will orbit the internal gear axis A7 at the same speed and will also have the same angular velocities about their own axes A8. The two pinions 206, 214 combine to form a combined pinion 212.

The gearbox 200 has an input shaft 202 arranged to receive a torque from a drive source, such as a motor. The input shaft 202 is shaped as a crank such that it receives a torque about the gearbox axis A7 (i.e. the axis of the internal gears 208, 216) and it provides a force to the external, pinion gears that is offset from the axis of the gearbox, which is a linear force through the external gear axis A8. The input shaft 202 is supported to rotate about the gearbox axis by a first bearing arrangement 222 and is coupled to the external, pinion gears via a bearing 224 so that the external, pinion gears may rotate about the portion of the input shaft passing through the external gears. The external gears also engage with the internal, annular gears such that the external, pinion gears 206, 214 (i.e. the combined pinion 212) and the offset portion of the input shaft 202 may orbit the internal gear axis A7 together. The input shaft also has a counterweight 203 to balance the off-axis loading of the offset portion.

The first internal-external gear pair 204 and the second internal-external 210 may have a small difference in their respective gear ratios. Such small differences can be achieved in a number of ways—for example by having a same tooth difference between internal and external gears, but a different total number of teeth in the internal and/or external gears of the respective gear pair. In other examples, the amount of the tooth-difference in each gear-pair can be varied to achieve different gear ratios. In one example, the internal gear 208 and external gear 206 of the first internal-external gear pair 204 may have 60 teeth and 57 teeth respectively and the internal gear 216 and external gear 214 of the second internal-external gear pair 210 may have 90 teeth and 87 teeth respectively.

The overall output of the gearbox 200 can be realised as a relative difference in rotation, about a common axis, between the two internal gears 208 and 216. One of the internal gears 208, 216 may be fixed, i.e. held stationary, and the other of the internal gears 208, 216 may be rotatable and taken as an output gear. The two gears may be coupled via a bearing 226. The fixation of the internal gear 208 is illustrated in FIG. 5 by the internal gear 208 of the first internal-external gear pair 204 being grounded, indicating that this is a reference gear. Due to one of the internal gears being held stationary, and the two internal-external gear pairs having similar gearing ratios, a high gear ratio may be achieved across the gearbox. While the internal gear 216 of the second internal-external gear pair 210 is shown as being coupled to a bearing proximate the input shaft, it will be understood that an output may be taken at the opposite axial end of the gearbox and that any suitable bearing arrangement may be used.

Generally, portions of a gearbox being described as "fixed", "input" and "output" are described as such only to reflect conventional uses of the gearbox and it will be understood that the considerations of the input, output and fixed parts may be a question of reference frame and that any part labelled, for example as "fixed", may alternatively be used as an "input" or an "output". In the context of the illustrated example, a drive input provided as a difference in rotation between the input shaft 202 and internal gear 208, results in an output, being a difference in relative rotation between internal gear 216 and internal gear 208.

Figure 9:
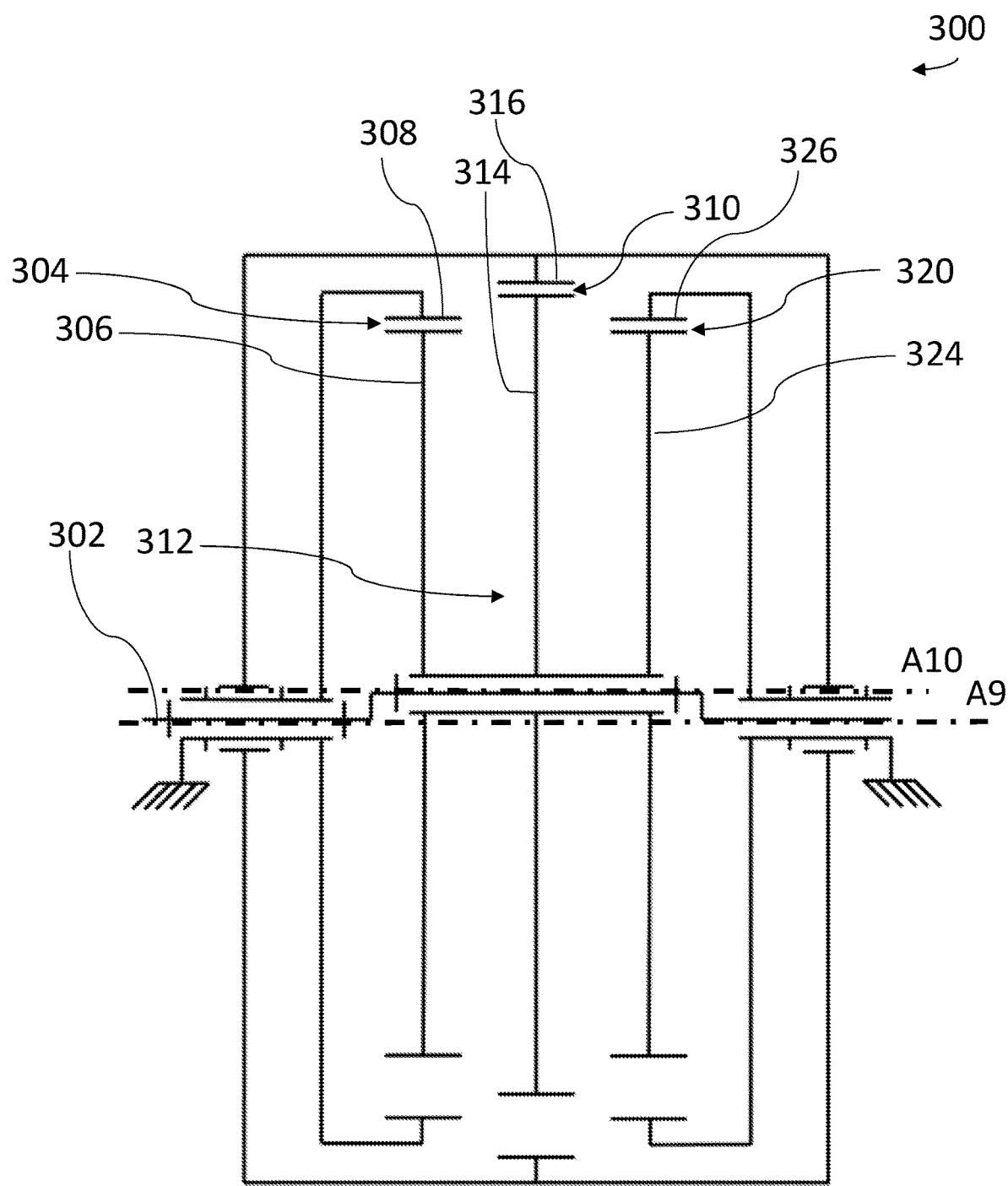
FIG. 9 is a schematic drawing showing a second gearbox according to embodiments of the invention.

FIG. 9 shows a further gearbox 300, the gearbox having a symmetric arrangement. The symmetric gearbox 300 has a first internal-external gear pair 304 and a second internal-external gear pair 310, each having respective internal gears 308, 316 and external gears 306, 314, which may be substantially similar to those described above with reference to FIG. 5. The external gears may orbit an internal gear axis A9 about which the internal gears are arranged and may rotate about their own external gear axis A10. The gearbox 300 further comprises a third internal-external gear pair 320 including an external gear 324 and an internal gear 326. The internal-external gear pair 320 may be substantially similar to the first internal-external gear pair 304, having the same gear ratio. The external gear 324 of the third internal-external gear pair 320 may be fixed to the other external gears 306, 314 rigidly such that the three gears orbit and rotate together and form a combined pinion 312.

A symmetric arrangement may be preferable as it may prevent or reduce twisting of the central external gear due to the axially opposed internal gears providing balanced forces to the external gear about an axis perpendicular to the gearbox axis.

Further, the input shaft 302 may have bearings at both axial ends, avoiding a cantilever arrangement due to the reaction force from the planet gears 306, 314, 324. This may strengthen the input shaft 302.

Figure 10A:
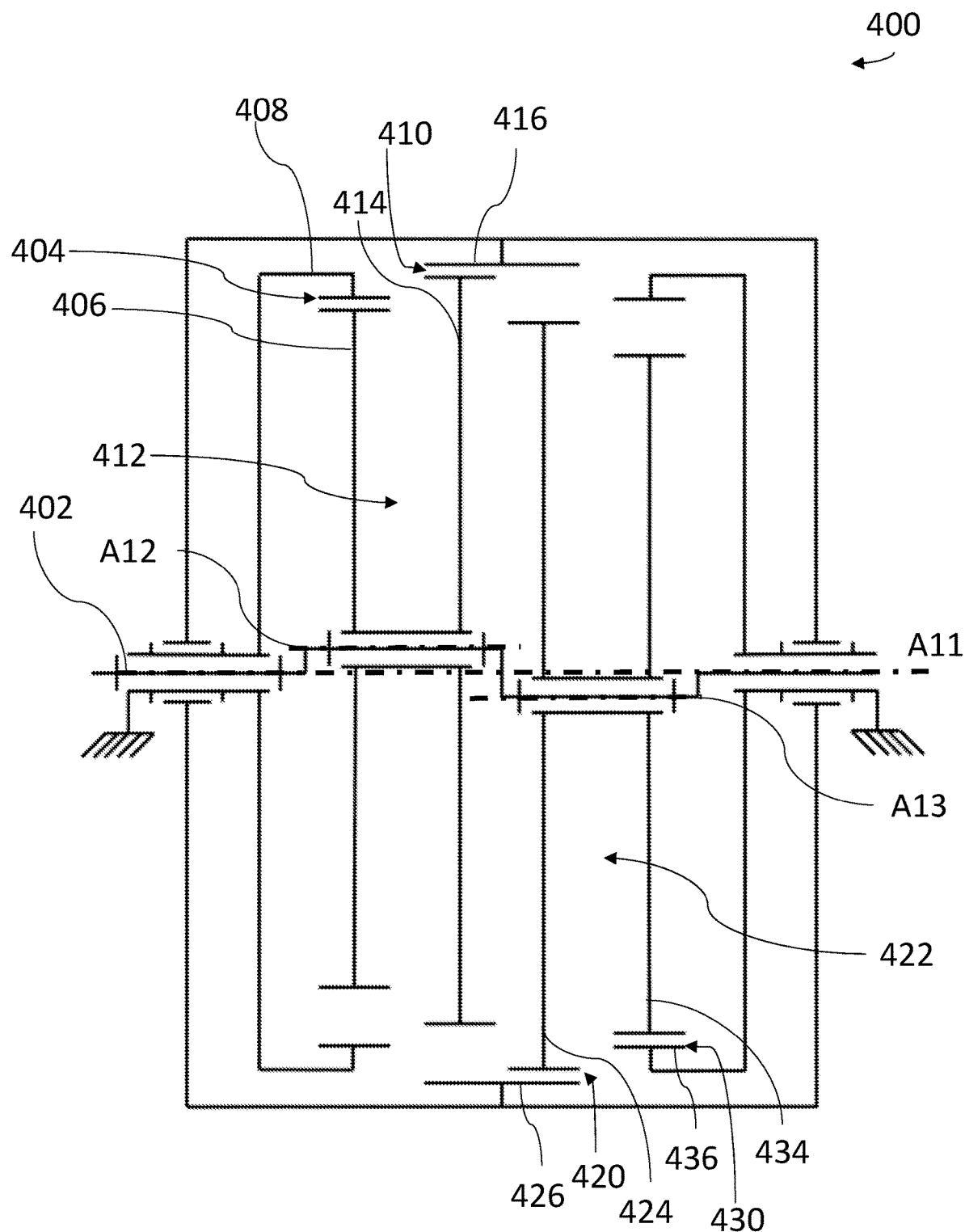
FIG. 10a is a schematic drawing showing a third gearbox according to embodiments of the invention.
Figure 10B:
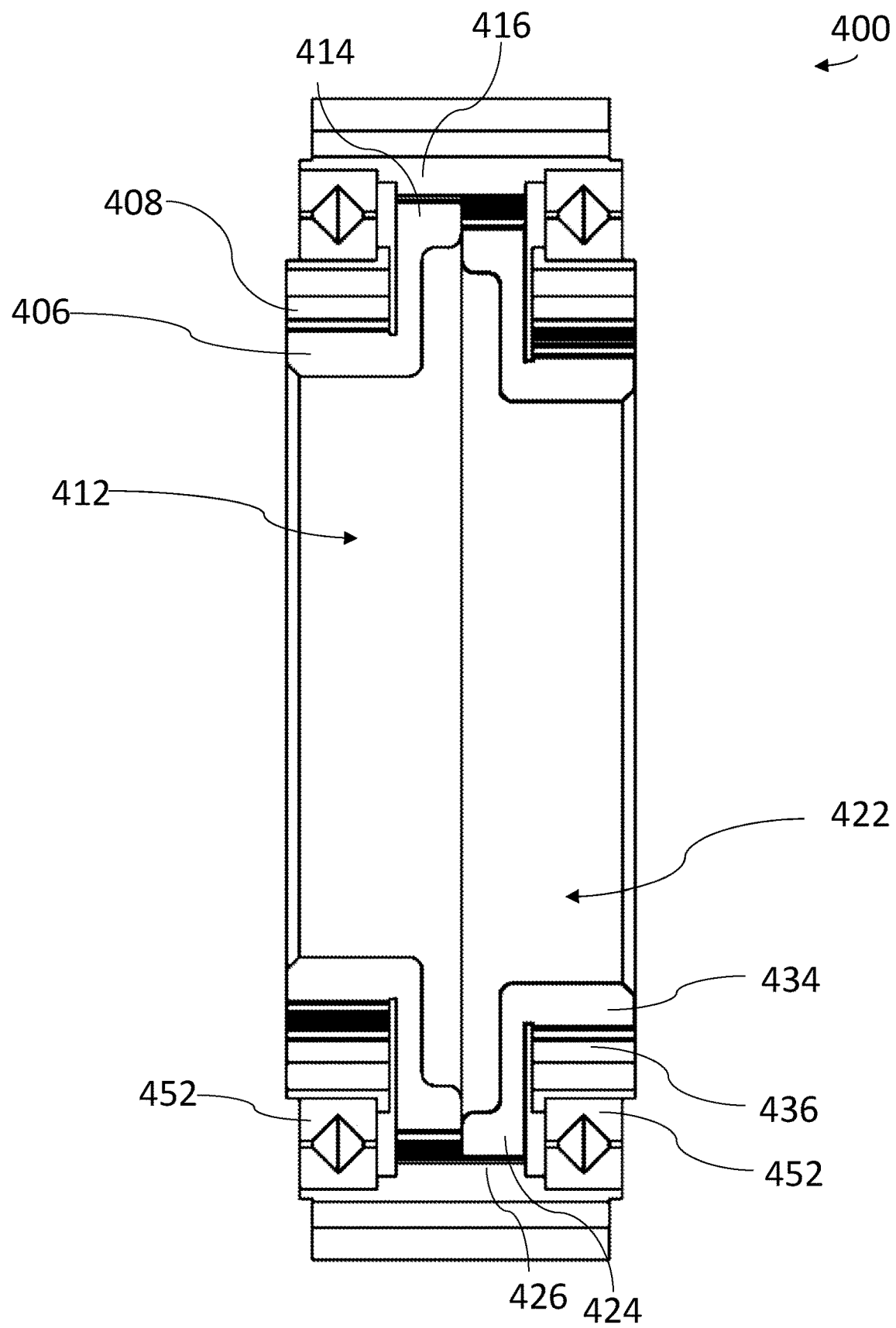
FIG. 10b is a cross sectional drawing showing the third gearbox according to embodiments of the invention.

FIGS. 10a and 10b show a third gearbox arrangement 400, which is substantially similar to the two diametrically opposed and axially mirrored copies of the gearbox 200 of FIG. 5.

The gearbox 400 has two separate planet gears 412, 422, each planet gear having two external gears rigidly fixed together. The first planet 412 has external gears 406, 414, arranged about a first external gear axis A12 which are arranged to engage with respective internal gears 408, 416 such that the external gears 406, 414 orbit the internal gear axis A11. The gears 406, 408, 414, 416 form the first and second internal-external gear pairs 404, 410. The second planet 422 has third and fourth external gears 424, 434, arranged about a second external gear axis A13. The third and fourth external gears 424, 434 are arranged to engage with respective internal gears 426, 436 and to orbit the internal gear axis A12. The gears 424, 426, 434, 436 form third and fourth internal-external gear pairs 420, 430.

It will be understood that the first and fourth external gears 406, 434 may be identical and the second and third external gears 414, 424 may be identical. In some cases, all of the first, second, third and fourth external gears 406, 414, 424, 434 may be identical.

The first and fourth outer gears 408, 436 may also be identical and the second and third internal gears 416, 426 may be identical. In some cases, the second and third internal gears 416, 426 may be formed integrally, with common gear teeth and may be mounted on a bearing 452 so as to rotate relative to the first and fourth internal gears 408, 436. Generally, the first and fourth internal-external gear pairs 404, 430 may each have a small difference in gear ratio from the second and third internal-external gear pairs 410, 420 such that overall a differential planetary gearbox 400 may be provided.

The gearbox 400 has an input shaft 402, which is crank-shaped such that it has two diametrically opposed portions, each offset from the internal gear axis A11 by the same distance, such that each offset portion lies along an axis of a respective external gear A12, A13. The offset portions are each coupled to a respective one of the first and second planets 412, 422 via bearings such that the input shaft 402 imparts a linear force to the planets that is offset from the internal gear axis A11.

In this way, there may be provided a symmetric gearbox 400 with a centre output and improved balancing.

Figure 11:
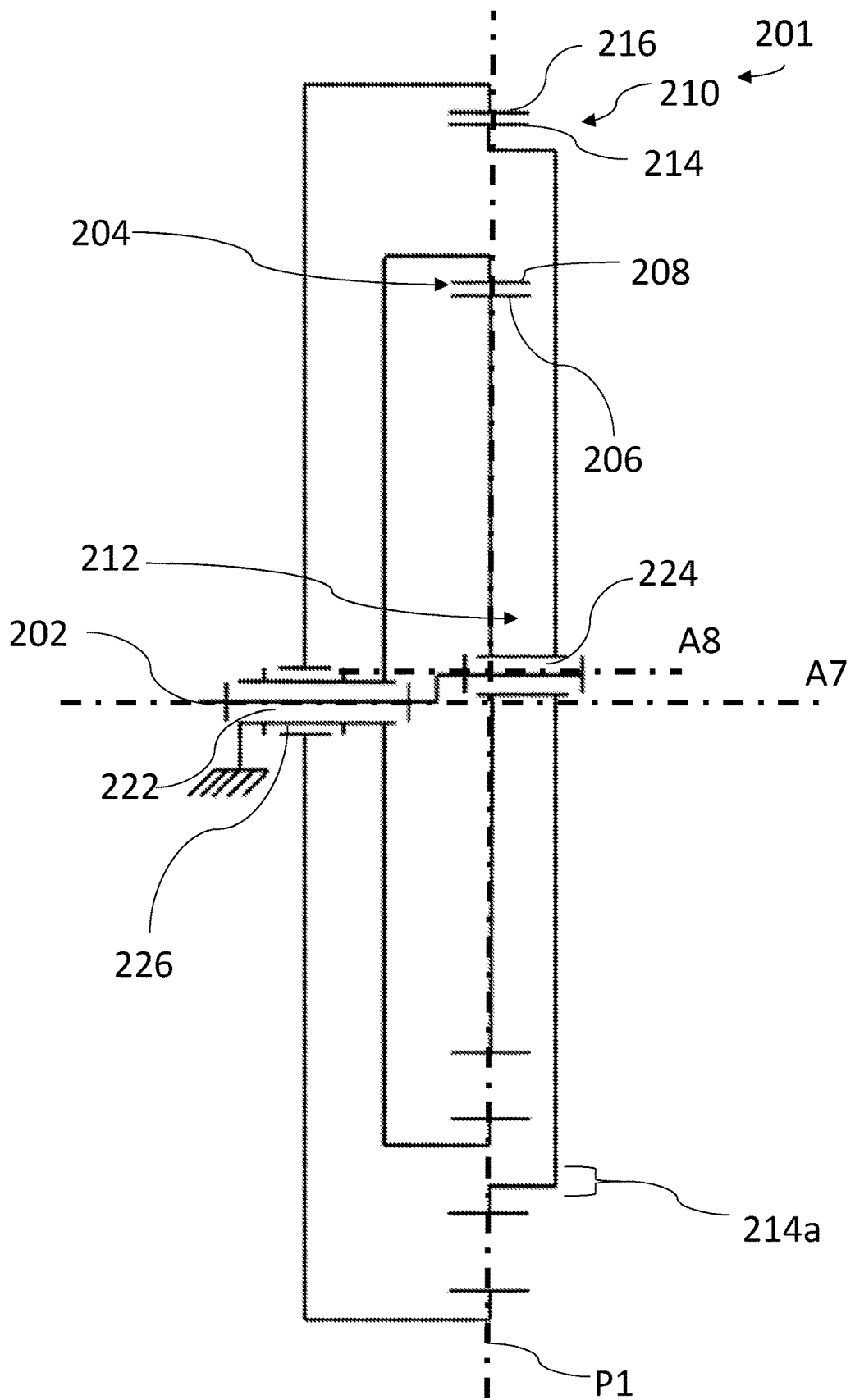
FIG. 11 is a schematic drawing showing a fourth gearbox according to embodiments of the invention.

FIG. 11 shows a gearbox 201 with features substantially similar to the gearbox 200 of FIGS. 8*a* and 8*b*. For brevity, similar features are numbered similarly and are not described again here.

In the gearbox 201, the external, pinion gear 214 of the second internal-external gear pair 210 has a stepped portion 214*a*, which allows the external pinion gear 214 to be located in two separate axial planes normal to the axis or axes of rotation of the combined gear pair 212. In particular, the engagement of the second internal-external gear pair 210 and the engagement of the first internal-external gear pair 204 at least overlap, or are coplanar with, a common plane P1, the common plane P1 being normal to the axes of rotation of the gears A7, A8. The internal gear 208 sits at least partially in a recess or cavity of the combined pinion gear 212. This can allow the gear pair 204 to be disposed at least partially within the external gear 214. This can further allow the gear pair 204 to be located partially or completely within the gear pair 210.

By engaging the first and second internal, external gear pairs 204, 210 in a common plane, twisting of the combined pinion gear 212 may be reduced. Further, a more compact gearbox 201 may be provided as the axial extent of the gearbox 201 may be reduced.

The gearbox 201 shown in FIG. 11 may have any type of gear tooth. In certain examples, the gearbox 201 of FIG. 11 may have one or more features of the gear teeth as described with reference to FIGS. 1 to 7 and in particular FIG. 3. The gear teeth may have any feature of the gear teeth described with reference to FIG. 3, such as an addendum coefficient within the defined range and/or a profile shift within the defined range.

In any or all of the above-described gearbox arrangements, gears may have the features or qualities described above with reference to any of FIGS. 1 to 7 and in particular FIG. 3. In particular, the gears may exhibit a small profile shift and a low addendum coefficient, as described above.

The invention claimed is:

1. A gearbox comprising an internal-external gear pair having a small tooth number difference, the internal-external gear pair comprising:
   an internal gear, arranged about an internal gear axis and having a first number of internal gear teeth; and
   an external gear having an external gear axis arranged to orbit the internal gear axis and having a second number of external gear teeth, the external gear being arranged to engage with the internal gear teeth;
   wherein the small tooth number difference, between the second number of external gear teeth and the first number of internal gear teeth, is less than a fifth of the number of internal gear teeth;
   wherein the internal gear teeth and the external gear teeth have an involute shape with no profile shift, or with a profile shift below a value at which respective working pressure angles of the external gear teeth and the internal gear teeth differ by more than 20% of the working pressure angle of the external gear teeth;
   wherein at least one of the internal gear teeth and the external gear teeth has an addendum coefficient of less than 0.8; and
   wherein at least one of the internal gear teeth and the external gear teeth have an addendum coefficient greater than 0.3.

2. The gearbox of claim 1, wherein a theoretical contact ratio of the internal-external gear pair, calculated for a gearbox having the same geometry and no deformation of the material, is less than 1.

3. The gearbox of claim 1, wherein at least one of the internal gear teeth and the external gear teeth have an addendum coefficient less than 0.7.

4. The gearbox of claim 1, wherein the profile shift coefficient of the internal gear is less than 0.1.

5. The gearbox of claim 1, wherein a theoretical contact ratio of the internal-external gear pair, calculated for a gearbox having the same geometry and no deformation of the material, is less than 0.8.

6. The gearbox of claim 1, wherein a loaded contact ratio for the gearbox generated in use is more than 100% greater than a theoretical contact ratio calculated for a gearbox having the same geometry and no material deformation.

7. The gearbox of claim 1, wherein a sum of the addendum coefficients of the internal gear teeth and the external gear teeth is less than 1.6.

8. The gearbox of claim 1, wherein the internal gear and the external gear have a helix angle of 0°.

9. The gearbox of claim 1, wherein the external gear is a first external gear, the internal gear is a first internal gear, and wherein the gearbox further comprises a second external gear coupled to the first external gear and a second internal gear movable relative to the first internal gear, the second external gear being inside the second internal gear and arranged to engage with the second internal gear.

10. The gearbox of claim 9, wherein the second external gear and the second internal gear form a second small tooth difference internal-external gear pair having a tooth number difference of less than a fifth of the number of gear teeth of the second internal gear;
   wherein the second internal gear teeth and the second external gear teeth have an involute shape with no profile shift, or with a profile shift below a value at which the respective working pressure angles of the second external gear teeth and the second internal gear teeth would differ by more than 20% of the working pressure angle of the second external gear teeth; and wherein at least one of the second internal gear teeth and the second external gear teeth has an addendum coefficient of less than 0.8.

11. The gearbox of claim 9, wherein the first external gear is fixed to the second external gear and the second internal gear is arranged to rotate relative to the first internal gear, about the internal gear axis.

12. The gearbox of claim 9, wherein providing an input to drive the first external gear to orbit the first internal gear axis causes an output as a relative rotation between the first and second internal gears about the internal gear axis.

13. The gearbox of claim 9, wherein the engagement between the first internal gear and the first external gear and the engagement between the second internal gear and the second external gear overlap a common plane orthogonal to their axes of rotation.

14. The gearbox of claim 9, further comprising a third internal gear and a third external gear, the third external gear being inside the third internal gear and arranged to engage with the third internal gear, wherein the third external gear is coupled to the first and second external gears such that the second external gear is between the first and third external gears, and wherein the third internal gear is fixed relative to the first internal gear.

15. A symmetric gearbox comprising a first gearbox and a second gearbox of claim 9, wherein:

the second external gear and the second internal gear of the second gearbox form a second small tooth difference internal-external gear pair having a tooth number difference of less than a fifth of the number of gear teeth of the second internal gear, the second internal gear teeth and the second external gear teeth of the second gearbox have an involute shape with no profile shift, or with a profile shift below a value at which the respective working pressure angles of the second external gear teeth and the second internal gear teeth would differ by more than 20% of the working pressure angle of the second external gear teeth, at least one of the second internal gear teeth and the second external gear teeth of the second gearbox has an addendum coefficient of less than 0.8, the first internal gears are fixed together and the second internal gears are fixed together, and the first gearbox and the second gearbox are arranged symmetrically and coaxially.

16. The symmetric gearbox of claim 15, wherein the respective external gears of the first and second gearboxes are arranged to orbit about the internal gear axis 180° out of phase from each other.

17. An internal-external gear pair comprising:

an internal gear, arranged about an internal gear axis and having a first number of internal gear teeth; and an external gear having an external gear axis arranged to orbit the internal gear axis and having a second number of external gear teeth, the external gear being arranged to engage with the internal gear teeth;

wherein the internal gear teeth and the external gear teeth have respective pressure angles, measured at midpoints of working portions of the gear teeth, that differ by less than 20% of the pressure angle of the external gear teeth;

wherein at least one of the internal gear teeth and the external gear teeth has an addendum coefficient of less than 0.8; and wherein the internal-external gear pair has an instantaneous centre of rotation, ICR, defined as a point at which a radius drawn through the internal gear axis and the external gear axis intersects pitch circles of the external and internal gears, and wherein all tooth pairs transferring load between the external and internal gears are contained within an arc of twenty degrees centered about the ICR.

18. The internal-external gear pair of claim 17, wherein the internal gear teeth and the external gear teeth have the same respective pressure angles measured at the respective midpoints of the respective working portions of the gear teeth.

19. An internal-external gear pair comprising:

an internal gear, arranged about an internal gear axis and having a first number of internal gear teeth; and an external gear having an external gear axis arranged to orbit the internal gear axis and having a second number of external gear teeth, the external gear being arranged to engage with the internal gear teeth;

wherein the internal gear teeth and the external gear teeth have standard modules and no profile shift;

wherein at least one of the internal gear teeth and the external gear teeth each has an addendum coefficient of less than 0.8; and wherein at least one of the internal gear teeth and the external gear teeth have an addendum coefficient greater than 0.3.

* * * * *